March 29, 1960 S. J. MORRISSEY 2,930,638
SUPPORT STRUCTURE FOR DISPLAYS, PARTITIONS AND THE LIKE
Filed June 17, 1957 2 Sheets-Sheet 1
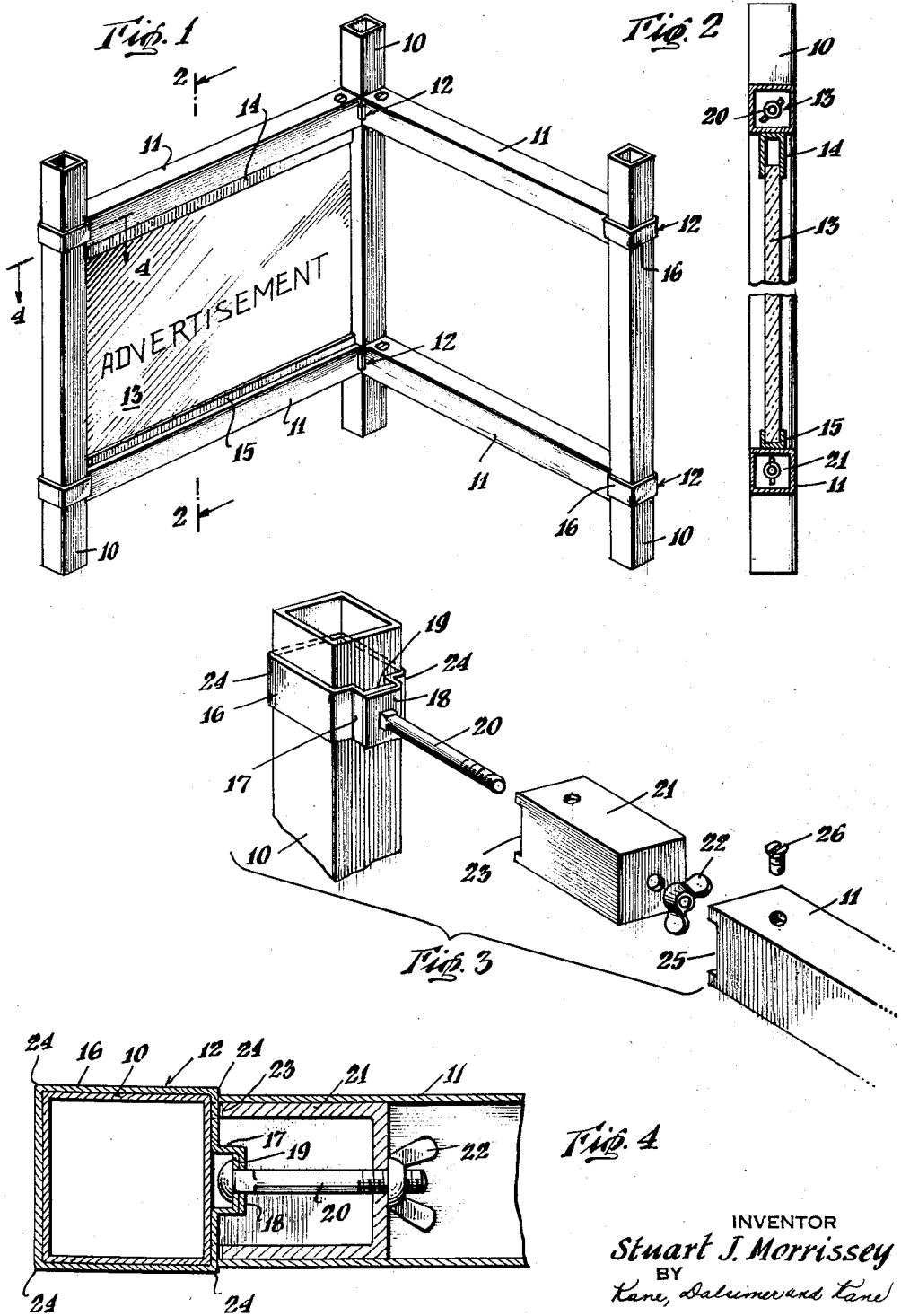
INVENTOR
Stuart J. Morrissey
BY
Kane, Dalsimer and Kane
ATTORNEYS

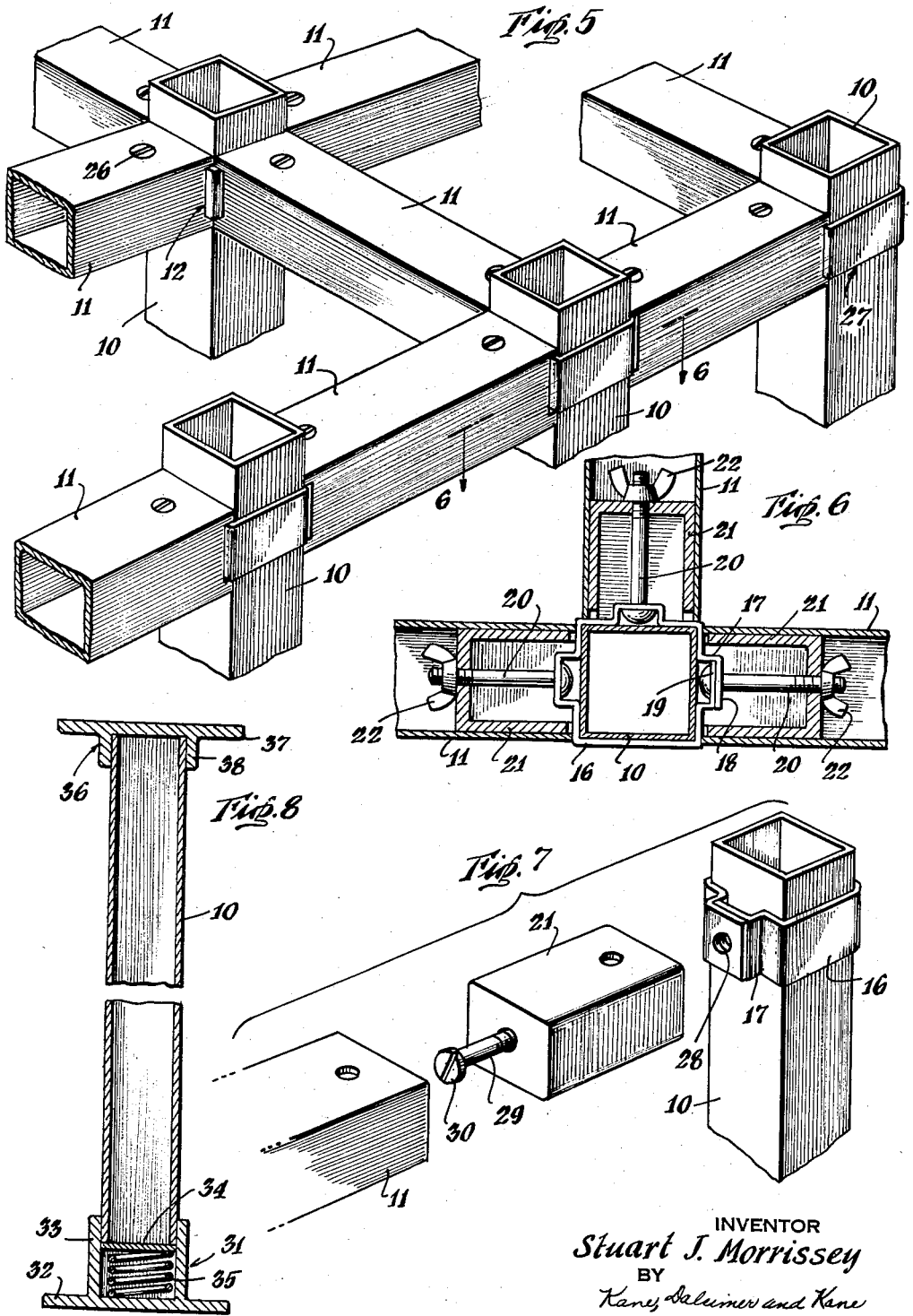

United States Patent Office 2,930,638
Patented Mar. 29, 1960

2,930,638

SUPPORT STRUCTURE FOR DISPLAYS, PARTITIONS AND THE LIKE

Stuart J. Morrissey, Port Washington, N.Y.

Application June 17, 1957, Serial No. 665,949

3 Claims. (Cl. 287—54)

This invention relates to support structures for displays, partitions and the like. More specifically, it relates to structures which may be readily assembled and disassembled for movement from place to place.

In recent years movable support structures, which are adapted to mount display boards, partitions and the like, have become increasingly popular. Structures of this type are utilized in stores, offices, factories, homes and, in fact, in all places where it is desired to temporarily mount a display board or other type of panel.

Prior to this invention, support structures, of the type referred to, were in most cases flimsy and not easily adaptable to varied uses. The structures which were rugged and able to withstand rough handling were difficult to assemble and disassemble.

This invention overcomes the difficulties encountered in the prior art. By means of this invention a movable support structure is provided which, though readily assembled and disassembled, is sturdy, neat in appearance and adaptable to many varied uses.

It is, therefore, an object of this invention to provide a support structure which is readily assembled and disassembled.

It is also an object of this invention to provide a support structure which may take many varied forms and may be utilized to mount objects such as display boards, partitions and the like.

It is also an object of this invention to provide a means for removably securing portions of the structure together such that a neat, sturdy support of any desired shape may be constructed with a minimum of effort.

It is further an object of this invention to provide a support structure which may be assembled and disassembled by untrained persons.

It is a still further object of this invention to provide a support structure which can be manufactured by quantity production methods, is economical and of such rugged character that it will function over a long period of time with freedom from all difficulty.

With these and other objects in mind, reference is had to the attached sheets of drawings, illustrating one form of the invention, wherein like characters represent like parts and in which:

Fig. 1 is a perspective view illustrating the support structure of this invention mounting a display board;

Fig. 2 is a vertical section taken in the direction of the arrows 2—2 of Fig. 1;

Fig. 3 is an exploded perspective view showing one form of means for securing the portions of the support structure with respect to each other;

Fig. 4 is a sectional view taken in the direction of the arrows 4—4 in Fig. 1;

Fig. 5 is a perspective view illustrating a support structure of this invention in a variety of forms;

Fig. 6 is a sectional view taken in the direction of the arrows 6—6 of Fig. 5;

Fig. 7 is an exploded perspective view illustrating an alternative means for securing the portions of the support structure with respect to each other, and;

Fig. 8 is a vertical section illustrating a structure whereby this invention may be mounted between the floor and ceiling of a room.

Basically, the invention is a support structure adapted to take many different forms and serve a variety of functions.

In Figs. 1 and 2, the support structure illustrated forms two sections at right angles, the sections being adapted to support a display board or like panel. Vertically positioned elongated square supports 10 are spaced one from another by means of horizontally positioned cross-members 11. The cross-members, which are elongated hollow square tubes, are removably secured to the vertically positioned supports 10 by means of a coupling, generally indicated by the numeral 12. A display board, or like panel, 13 is removably supported between the cross-members 11 by means of channels 14 and 15. Channels 14 and 15 may be secured to their respective cross-members by any means known to the art. The channels, which extend substantially the full length of their respective cross-members 11, are of unequal depths to facilitate the mounting of the panel. The installation of panel 13 is accomplished by inserting the upper edge of the panel into channel 14 such that its lower edge may be positioned over channel 15. The panel is then dropped into channel 15, and in this manner is retained between cross-members 11 by means of the vertically extending sides of the channels.

It should here be noted that a variety of objects may be supported from or between cross-members 11, in lieu of panel 13, and the component parts of the structure illustrated in Fig. 1 may be associated in many different combinations.

The coupling 12, which retains and positions cross-members with respect to support 10, is best described by reference to Figs. 3 and 4. A strap or tensioning band 16 is frictionally mounted on support 10 to substantially conform to the contour thereof. The strap, which may conveniently be cut, stamped or formed in any other manner known to the art from sheet metal, is provided at one side of support 10 with a bulged portion 17. The bulged portion 17 forms the juncture between ends 18 and 19 of strap 16. An opening is provided through bulged portion 17 to accommodate the neck of a bolt 20 such that the bolt extends outwardly of strap 16 and is prevented from turning therein. A positioning and tensioning member removably embraces strap 16 and houses bulged portion 17 and bolt 20. The member, which is here shown as cup 21 and may conveniently be cast or formed in any other manner known to the art, is provided at the end directed away from strap 16 with an opening through which bolt 20 extends. A winged nut 22, or other retaining means, is provided to engage bolt 20, outwardly of cup 21. The opposite end of cup 21 is notched as at 23 to house strap 16 such that the cup abuts support 10 when the cross-member 11 is secured thereto. The positioning and tensioning member may take a variety of forms other than as depicted in the drawings, as to be more fully explained.

In utilizing coupling 12, to removably secure cross-member 11 to support 10, the bolt 20 is first extended through the opening in bulged portion 17 of strap 16. The strap 16 is then positioned on support 10 such that the bulged portion 17 is adjacent the side of the support to which cross-member 11 is to be secured. Cup 21 is mounted over strap 16 to house bulged portion 17 and bolt 20. The bolt 20 extends through the opening provided therefor in cup 21, and nut 22 is engaged with the bolt to lock the coupling 12 in assembled position.

It should be here noted that the engagement of bolt 20 with nut 22 not only locks the coupling in assembled position, but concurrently therewith retains the coupling against movement with respect to support 10. On engaging the bolt and nut, as aforesaid, the bulged portion 17 is drawn inwardly of cup 21 and the corners 24 of strap 16 tightly grip their related corners of support 10.

Cross-member 11, which was previously described as an elongated hollow square tube, is telescoped over cup 21 to abut support 10. In order to facilitate the seating of the cross-member, notches 25 are conveniently provided on the end of the member adjacent support 10 to accommodate strap 16. The cross-member 11 is retained in telescoping engagement with cup 21 by set screw 26. In this manner, cross-member 11 is secured to support 10.

The positioning and tensioning member, as has been previously described, serves the dual purposes of retaining the coupling 12 in assembled position and tensioning the strap 16 to secure it to support 10. The member, which has been shown as a cup, may, of course, take many other forms as long as it is able to function as required. For example, the member may be a solid block provided with a bore for receiving the bolt 20. It is obvious that changes in the structure of the positioning and tensioning member may require some redesign of the remaining portions of the coupling. These, however, are within the scope of the invention as I contemplate it.

As previously stated, the support structure of this invention may be utilized for the construction of a variety of supporting devices. The provision of additional bulged portions 17 to strap 16 enables one to secure further cross-members 11 to the support 10 (Fig. 6). The additional bulged portions, which are conveniently pressed or stamped in the strap 16 may be formed on all four sides of the strap or any desired combination of sides. Five straps, each having a different combination of bulged portions, will enable one to form a structure including six different combinations of cross-members 11 with support 10. Figs. 4 and 5 illustrate five possible combinations. The sixth combination will be achieved by turning the strap, indicated by numeral 27 in Fig. 5, over such that cross-members 11 extend in opposite directions.

The support structure and couplings, as described, enables untrained as well as trained persons to assemble and disassemble display, partition and like units with a minimum of difficulty. The structures, on being completed, present an exceptionally neat appearance due to the fact that only a very small portion of the coupling is visible to the eye. Further, the interaction between the portions of the coupling provide a structure which is rugged and relatively tamper-proof.

Referring now to Fig. 7, an alternative form of coupling is illustrated. The coupling herein shown differs from that described with respect to Figs. 3 and 4 only in the means for securing the coupling assembly in position. In the instant coupling the bulged portion 17 of the strap 16 is provided with a threaded opening 28 to engage the threaded end of a bolt 29. Bolt 29 is provided at its opposite end with a flat head 30 adapted to prevent bolt 29 from moving inwardly of cup 21. Provision is made on head 30 whereby the bolt may be turned into engagement with threaded opening 28 in strap 16.

In order to assemble the coupling as shown in Fig. 7, the strap 16 is first positioned on support 10. Cup 21 is positioned to house bulged portions 17 of strap 16 and bolt 29 is inserted through the opening in the end of cup 21 to engage threaded bore 28 in bulged portion 17. The remaining steps in securing cross-member 11 to support 10 are the same as previously described.

In Fig. 8, I have illustrated foot and header attachments which may be associated with a support 10 such that a structure utilizing only one such support will stand without the aid of additional vertical supports. The foot member, generally indicated by the numeral 31, comprises a plate 32 and an integral vertically extending square cup 33. The foot 31 may be cast or formed in any other manner which is found desirable. A square plate 34 is slidably supported within cup 33 by a helical spring 35. The header which is generally indicated by the numeral 36 includes a flat plate 37 and a shallow square cup 38.

In constructing a structure wherein foot 31 and header 36 are utilized to mount a support 10 between the floor and ceiling of a room, the support is inserted into cup 33 to contact plate 34 and compress helical spring 35. While the helical spring is compressed, the support, which has mounted on its upper end a header 36, is moved into a vertical position and under the pressure of helical spring 35 frictionally engages the ceiling of the room. In this manner, the support 10 is retained in position.

Thus, among others, the several objects of the invention as aforenoted are achieved. Obviously, numerous changes in construction might be resorted to without departing from the spirit of the invention as defined by the claims.

I claim:

1. A support structure for displays and the like including: an elongated support member; an elongated cross-member positioned substantially at an angle with respect to said support member and having a hollow portion; and means releasably coupled to said support member and independently coupled to said cross-member, and said means releasably coupling said cross-member to said support member, said means including a tensioned strap frictionally mounted on said support member, a positioning and tensioning member having an opened end adjacent said strap and a closed portion with a bore extending through the latter to the opened end, adjusting means coupled with said strap and engaging said closed portion for decreasing and increasing the tension of said strap around said support member so that said strap is displaceable and securable to other parts of said support member and for retaining said positioning and tensioning member in an assembled position with respect to said strap and with respect to said support member, said strap being formed with a bulged portion having an opening therein, said bulged portion extending into said opened end of said positioning and tensioning member, said adjusting means being seated in said bulged portion and extending outwardly through said opening into said bore, said positioning and tensioning member being telescopically associated with said cross-member, retaining means being provided for releasably securing said cross-member to said positioning and tensioning member, and said cross-member being removable from said positioning and tensioning member while said strap remains mounted on said support member.

2. A support structure as in claim 1 wherein at least another like positioning and tensioning member is coupled to said strap by another one of the adjusting means and is telescopically associated with another one of the cross-members.

3. A support structure for displays and the like including an elongated support member; a plurality of elongated cross-members each positioned substantially at an angle with respect to said support member; a tensioned strap member frictionally mounted on said support member; an adjustable positioning and tensioning means releasably associated with each one of said cross-members and coupled to said strap for decreasing and increasing the tension of said strap around said support member so that said strap is displaceable and securable to other parts of said support member and for releasably retaining the associated cross-member in an assembled position with respect to said strap and with respect to said support member while permitting said cross-members to be removed from their associated adjustable positioning and tensioning means while said strap remains mounted on said support member.

References Cited in the file of this patent

UNITED STATES PATENTS

| | | |
|---|---|---|
| 1,090,929 | McFaddin | Mar. 24, 1914 |
| 1,460,928 | Tilden | July 3, 1923 |
| 2,107,037 | Kippenberg et al. | Feb. 1, 1938 |

FOREIGN PATENTS

| | | |
|---|---|---|
| 826,354 | France | Jan. 4, 1938 |